UNITED STATES PATENT OFFICE.

HENRY DREYFUS, OF BASEL, SWITZERLAND.

PROCESS OF MAKING CELLULOSE ACETATES.

1,278,885. Specification of Letters Patent. Patented Sept. 17, 1918.

No Drawing. Application filed September 23, 1915. Serial No. 52,297.

*To all whom it may concern:*

Be it known that I, HENRY DREYFUS, a citizen of the Republic of Switzerland, residing at Basel, Switzerland, have invented certain new and useful Improvements in Processes of Making Cellulose Acetates, of which the following description is a specification.

The present invention relates to improvements in the manufacture of cellulose acetates and constitutes an improvement upon the method described and claimed in my U. S. Reissue Patent No. 14,338.

Most of the cellulose acetates previously produced, were soluble in chloroform, and were not capable of producing viscous solutions in acetone. The process of the present invention allows of producing, especially on a large scale of manufacture, cellulose acetates not soluble in chloroform, but soluble in alcohol-chloroform, and very soluble in acetone of a relatively high concentration, and which give (especially their products of further transformation according to the process of my U. S. Patent 1,217,722) products which give highly viscous solutions in acetone.

The acetylation solutions are also highly viscous solutions and in some cases nearly stiff gelatinous masses which will hardly flow but nevertheless are clear solutions of cellulose acetate. The so obtained cellulose acetates can be transformed according to the process of my U. S. Patent 1,217,722. The invention is based upon the regulation of the temperature at various stages of manufacture, the use of relative proportions of cellulose, sulfuric acid as condensing agent, acetic anhydrid, glacial acetic acid or other diluent, the use of very low temperatures before acetylation takes place, so that before the acetylating reaction, a hydration or a hydrolyzation at low temperature of the cellulose takes place, and other features which will hereinafter appear.

In carrying out my process, it is very necessary to avoid heating, particularly during the early stages of the process, and to maintain the temperature as low as possible at the beginning and for some time thereafter. Accordingly I cool the acetylating solution before the introduction of the cellulose, to a temperature of about 0° C. or lower, or in any event to a temperature not above about 5° C. and preferably a temperature lower than 5° C. The cellulose is then introduced in such a manner that after the introduction of the cellulose the temperature will be below 15° C. and preferably even below 5° C.

I have found that if one subjects the acetylating mixture to intense and prolonged cooling before the introduction of the cellulose and this not only down to about 0° C. but still lower, in such a manner that one thereby overcomes the tendency to heat up spontaneously on account of the heat generated upon the introduction of the cellulose, and this in such a way that even after the introduction of this cellulose the temperature can be kept during the early stages of the process under about 15° C., and with preference under about 5° C., it is possible to obtain acetylation solutions of the highest possible viscosity, which nevertheless are clear without fibers, that is to say, stiff.

Said temperature of under 15° and preferably under 5° C. having been observed during the introduction of the cellulose and for some time thereafter, the temperature is allowed to rise gradually in the reaction mixture to about 20° or 25° C., or it may be even to 30°–35° C., and the temperature is maintained below 25° C. or not above 35° C. at most, until the cellulose has been dissolved and the product shows the insolubility in chloroform and solubility therein on addition of alcohol. There will then result a viscous solution which is clear, free or substantially free from unconverted fibers and nevertheless a stiff gelatinous mass scarcely flowing or flowing only with difficulty. The products isolated at this stage will be easily soluble in acetone of greater or less concentration of say, about 90 or 95% or more as indicated in my U. S. Patent Reissue No. 14,338. Assuming that the temperature, as before mentioned, of under 15° and preferably under 5° C. has been observed at the beginning and for some time afterward, the temperature can be afterward allowed to rise to the higher temperatures mentioned for finishing, without sacrificing, to any very great extent, the high viscosity, even if the higher temperatures are maintained for some time.

This new effect is perhaps due to the fact that cellulose is intensively attacked or depolymerized at temperatures of 15 to 20° C. and especially in treating it with the acetylating mixture, besides its hydration or hydrolyzation, while by effecting the hydrolyzation or hydration of the cellulose before the acetylation, at the very low temperatures, the cellulose is protected against depolymerization and if the temperature is allowed to rise only after acetylation the molecule of cellulose is already protected against depolymerization by the presence of the acetyl groups.

The quantity of sulfuric acid employed is of great importance. It is desirable to use from about 5 to 20% based upon the amount of cellulose used. The larger the amount of sulfuric acid is, the more one must take notice of the amount of moisture in the cellulose, that is to say, the smaller must be the amount of moisture, as otherwise one will obtain mucilaginous masses.

In carrying out the present process on a large scale it is preferable not to employ dry cellulose but cellulose having a moisture content of about 3 to 6%, in which case the reaction goes on more readily, because with a dry cellulose the reaction goes more slowly and the solutions are therefore less viscous when they finally become clear.

That the temperature and the quantity of sulfuric acid are simultaneously of importance is shown by the fact that if the quantity of sulfuric acid employed, calculated on the weight of the cellulose, is reduced to 2, 3 or even 5%, and the cellulose is introduced at the temperature of 20 to 25° C., a reaction takes place at the beginning, which is manifested by a rise of the temperature of 15 to 17° C. for example, but as soon as this spontaneous heating has stopped, according to the case, for example in half an hour, the temperature again falls to the initial temperature and the whole process remains practically inactive, even after 24 to 48 hours; no solution in any case results. The reaction product contains a very large quantity of fibers, becomes pasty, opaque and whitish and successively there is formed a gelatinous mass which becomes harder and harder the longer it stands, until finally it can be pulverized. It is evident that such products have no value. On the other hand if the reaction is begun at low temperatures, for example 0° to 5° C., and if only after some time one passes on to 10° to 15° C. and finally to 20° C. and more, there is formed in this case a solution, that is to say a clear transparent mass, or a solution which is nearly stiff or difficultly mobile, in which all the fibers have disappeared before the mass has become gelatinized to a white or opaque mass.

As in my prior patent, the amount of acetylating agent employed is always less than three times the weight of the cellulose and preferably about 2½ times the weight of the cellulose employed.

The products of direct acetylation may be treated in accordance with the process of my U. S. Patent 1,217,722. The proportion of sulfuric acid will to a certain extent determine the length of time necessary for the completion of the secondary reaction; the smaller the amount of sulfuric acid, the slower will be this reaction. Also the lower the temperature employed the slower will be the secondary reaction. Moreover, the choice of different quantities of water for the second reaction and the effect of the amount of water upon the solubilities developed in the second reaction, are the same as described in my Patent 1,217,722, the same different products being produced, as are described therein.

In order to more completely illustrate my invention, I give the following example, but to which the scope of the invention is not limited.

Into a mixture of 300 to 400 kilos of glacial acetic acid, 250 kilos of acetic anhydrid, and 10 to 15 kilos of sulfuric acid which has been cooled by prolonged cooling to about 0° C. or preferably to about minus 3° C. (which promotes a partial crystallization of glacial acetic acid) are introduced 100 kilos of cotton or paper containing about 3 to 6% of moisture, while the mass is well stirred in a malaxator or kneading apparatus and the reaction is allowed to proceed with constant malaxating and kneading, while preferably maintaining a temperature below 5° C., and in any event below 15° C. The temperature if above 5 to 10° C. will then be brought down to within that range. After the reaction has continued for about 2 to 3 hours at this low temperature, the temperature may be allowed to rise slowly to 15 or 20° C., and later on, the temperature may be allowed to rise to 25 or even 30° C.; the temperature may even go higher for example to about 35° C., but these high temperatures are to be avoided if possible, since they decrease the viscosity of the product.

After this, the artificial cooling is stopped and the reaction is allowed to go on, until the disappearance of free fibers. Thereafter one allows the reaction to go on for a short time, according to the desire and one then isolates the cellulose acetate when a test portion shows the insolubility in chloroform, but solubility therein upon the addition of alcohol. This isolation can be made directly (at once) by precipitating with water, etc., or one can partially or wholly neutralize the sulfuric acid by appropriate bases, or one can let the reaction go on according to my Patent 1,217,722.

The product precipitated before the further treatment is insoluable in chloroform.

The product precipitated is insoluble in chloroform, but is soluble in chloroform-alcohol. It is very soluble in acetone of about 90 to 95° strength, more or less. The product becomes soluble in dilute alcohol by submitting to the further treatment according to my Patent 1,217,722.

I claim:—

1. A process of making cellulose acetate which comprises cooling an acetylizing mixture containing sulfuric acid, acetic anhydrid and a diluent, down to a temperature not above 5° C., introducing cellulose thereinto, while preventing a rise of temperature to above 15° C., allowing the mixture to remain at temperatures below 15° C., until the desired amount of hydrolyzation has taken place, thereafter allowing the temperature to rise to not above 35° C., and maintaining the temperature below 35° C., until the cellulose has dissolved and the cellulose acetate formed is insoluble in chloroform and soluble in chloroform mixed with alcohol.

2. A process of making cellulose acetate which comprises cooling an acetylizing mixture containing sulfuric acid as a condensing agent, acetic anhydrid and a diluent, down to a temperature not above 0° C., introducing cellulose thereinto, while preventing a rise of temperature to above 15° C., allowing the mixture to remain at temperatures below 15° C., until the desired amount of hydrolyzation has taken place, thereafter allowing the temperature to rise to not above 35° C., and maintaining the temperature below 35° C., until the cellulose has dissolved and the cellulose acetate formed is insoluble in chloroform and soluble in chloroform mixed with alcohol.

3. A process of making cellulose acetate which comprises cooling an acetylizing mixture containing sulfuric acid as a condensing agent, acetic anhydrid and a diluent, down to a temperature not above minus 3° C., introducing cellulose thereinto, while preventing a rise of temperature to above 5° C., allowing the mixture to remain at temperatures below 15° C., until the desired amount of hydrolyzation has taken place, thereafter allowing the temperature to rise to not above 35° C., and maintaining the temperature below 35° C., until the cellulose has dissolved and the cellulose acetate formed is insoluble in chloroform and soluble in chloroform mixed with alcohol.

4. A process of making cellulose acetate which comprises cooling an acetylizing mixture containing sulfuric acid, acetic anhydrid and a diluent, down to a temperature not above minus 3° C., introducing cellulose thereinto, while preventing a rise of temperature to above 15° C., allowing the mixture to remain at temperatures below 15° C., until the desired amount of hydrolyzation has taken place, thereafter allowing the temperature to rise to not above 25° C., and maintaining the temperature below 25° C., until the cellulose has dissolved and the cellulose acetate formed is insoluble in chloroform and soluble in chloroform mixed with alcohol.

5. A process of making cellulose acetate which comprises cooling an acetylizing mixture containing sulfric acid, acetic anhydrid and a diluent, down to a temperature not above 0° C., introducing cellulose thereinto, while preventing a rise of temperature to above 5° C., allowing the mixture to remain at temperatures below 15° C., until the desired amount of hydrolyzation has taken place, thereafter allowing the temperature to rise to not above 25° C., and maintaining the temperature below 25° C., until the cellulose has dissolved and the cellulose acetate formed is insoluble in chloroform and soluble in chloroform mixed with alcohol.

6. A process of making cellulose acetate which comprises cooling an acetylizing mixture containing sulfuric acid, acetic anhydrid and a diluent, down to a temperature not above minus 3° C., introducing cellulose thereinto, while preventing a rise of temperature to above 15° C., allowing the mixture to remain at temperatures below 15° C., until the desired amount of hydrolyzation has taken place, thereafter allowing the temperature to rise to not above 35° C., and maintaining the temperature below 35° C., until the cellulose has dissolved and the cellulose acetate formed is insoluble in chloroform and soluble in chloroform mixed with alcohol and thereafter allowing a further reaction in the presence of an acid material, to produce any desired changes in solubility, and then stopping such further reaction.

7. A process of making cellulose acetate which comprises cooling an acetylizing mixture containing sulfuric acid equal in amount to 5 to 20% of the cellulose to be used, acetic anhydrid and a diluent, down to a temperature not above minus 3° C., introducing cellulose thereinto, while preventing a rise of temperature to above 15° C., allowing the mixture to remain at temperatures below 15° C., until the desired amount of hydrolyzation has taken place, thereafter allowing the temperature to rise to not above 35° C., and maintaining the temperature below 35° C., until the cellulose has dissolved and the cellulose acetate formed is insoluble in chloroform and soluble in chloroform mixed with alcohol.

8. A process of making cellulose acetate which comprises cooling an acetylizing mixture containing sulfuric acid, acetic anhydrid and a diluent comprising glacial acetic acid, down to a temperature not above minus 3° C., introducing cellulose thereinto, while preventing a rise of temperature to above 15° C., allowing the mixture to remain at temperatures below 15° C., until the desired amount of hydrolyzation has taken place, thereafter allowing the temperature to rise to not above 35° C., and maintaining the temperature below 35° C., until the cellulose has dissolved and the cellulose acetate formed is insoluble in chloroform and soluble in chloroform mixed with alcohol.

9. A process of making a cellulose acetate which comprises introducing 100 parts of cellulose having about 3 to 6% of moisture into an acetylizing solution at a temperature of not over 0° C., said solution comprising about 250 parts of acetic anhydrid, about 300 to 400 parts of glacial acetic acid and about 10 to 15 parts of sulfuric acid, maintaining the temperature below 15° C. for some time after the introduction of the cellulose is complete, and thereafter maintaining the mixture at below 25° C. until the cellulose acetate formed is insoluble in chloroform and soluble in chloroform mixed with alcohol.

10. A process of making a cellulose acetate, which comprises cooling an acetylizing mixture containing sulfuric acid, acetic anhydrid in amount not exceeding three times that of the cellulose to be introduced, and a diluent, down to a temperature not above 0° C., introducing cellulose thereinto, while preventing a rise of temperature to above 15° C., allowing the mixture to remain at temperatures below 15° C. until the desired amount of hydrolyzation has taken place, thereafter allowing the temperature to rise to not above 35° C., and maintaining the temperature below 35° C. until the cellulose has dissolved and the cellulose acetate formed is insoluble in chloroform and soluble in chloroform mixed with alcohol.

11. A process of making a cellulose acetate, which comprises cooling an acetylizing mixture containing sulfuric acid, acetic anhydrid and a diluent, down to a temperature not above 0° C., introducing cellulose thereinto, while preventing a rise of temperature to above 15° C., allowing the mixture to remain at temperatures below 15° C. until the desired amount of hydrolyzation has taken place, thereafter allowing the temperature to rise to not above 35° C. and maintaining the temperature below 5° C. until the cellulose has dissolved and the cellulose acetate formed is insoluble in chloroform and soluble in chloroform mixed with alcohol, and thereafter allowing a further reaction in the presence of an acid material and water to produce any desired changes in solublity, whereby the amount of water present has an effect upon the solubilities developed by said treatment and then stopping such further reaction.

12. A process of making cellulose acetate which comprises cooling an acetylizing mixture containing sulfuric acid equal in amount to 5 to 20% of the cellulose to be used, acetic anhydrid and a diluent, down to a temperature not above 0° C., introducing cellulose thereinto, while preventing a rise of temperature to above 15° C., allowing the mixture to remain at temperatures below 15° C., until the desired amount of hydrolyzation has taken place, thereafter allowing the temperature to rise to not above 35° C., and maintaining the temperature below 35° C. until the cellulose has dissolved and the cellulose acetate formed is insoluble in chloroform and soluble in chloroform mixed with alcohol.

13. In the production of cellulose acetate having a high solubility in acetone, the improvement which comprises cooling an acetylating mixture at least down to a temperature below 5° C., and then introducing cellulose into such cooled acetylating mixture.

14th of October, 1914.

In testimony whereof I have hereunto subscribed my name.

HENRY DREYFUS.